(12) United States Patent
Ahn et al.

(10) Patent No.: US 9,583,267 B2
(45) Date of Patent: *Feb. 28, 2017

(54) MULTILAYER CERAMIC CAPACITOR AND BOARD HAVING THE SAME

(71) Applicant: SAMSUNG ELECTRO-MECHANICS CO., LTD., Suwon-Si, Gyeonggi-Do (KR)

(72) Inventors: Young Ghyu Ahn, Suwon-Si (KR); Hyun Tae Kim, Suwon-Si (KR); Hwi Geun Im, Suwon-Si (KR); Jin Kim, Suwon-Si (KR); Kyo Kwang Lee, Suwon-Si (KR); Byoung Hwa Lee, Suwon-Si (KR)

(73) Assignee: SAMSUNG ELECTRO-MECHANICS CO., LTD., Suwon-si, Gyeonggi-do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/826,658

(22) Filed: Aug. 14, 2015

(65) Prior Publication Data

US 2016/0049250 A1  Feb. 18, 2016

Related U.S. Application Data

(63) Continuation of application No. 14/527,662, filed on Oct. 29, 2014, now Pat. No. 9,396,879.

(30) Foreign Application Priority Data

Oct. 29, 2013 (KR) .......... 10-2013-0129120
Oct. 2, 2014 (KR) .......... 10-2014-0133068

(51) Int. Cl.
*H01G 4/30* (2006.01)
*H01G 2/06* (2006.01)
(Continued)

(52) U.S. Cl.
CPC ........... *H01G 4/30* (2013.01); *H01G 2/065* (2013.01); *H01G 4/012* (2013.01); *H01G 4/12* (2013.01);
(Continued)

(58) Field of Classification Search
CPC ........ H01G 4/005; H01G 4/12; H01G 4/012; H01G 4/30; H01G 2/065; H01G 4/35
See application file for complete search history.

(56) References Cited

U.S. PATENT DOCUMENTS 4,590,537 A  5/1986  Sakamoto
4,658,328 A  4/1987  Sakabe
(Continued)

FOREIGN PATENT DOCUMENTS

CN  101236837 A  8/2008
CN  101241800 A  8/2008
(Continued)

OTHER PUBLICATIONS

U.S. Office Action issued in related U.S. Appl. No. 14/527,662, mailed on Feb. 10, 2015, 50 pages.
(Continued)

*Primary Examiner* — David M Sinclair
(74) *Attorney, Agent, or Firm* — McDermott Will & Emery LLP (57) ABSTRACT

There are provided a multilayer ceramic capacitor and a board having the same. The multilayer ceramic capacitor may include: three external electrodes disposed on a mounting surface of a ceramic body to be spaced apart from each other and connected to lead portions of internal electrodes, wherein an interval between adjacent lead portions is 500.7 μm or less, widths of one-side margin portions of the
(Continued)

external electrodes in a length direction of the ceramic body that are not in contact with the corresponding lead portions are 20.2 μm or more.

23 Claims, 8 Drawing Sheets (51) Int. Cl.
   *H01G 4/12* (2006.01)
   *H01G 4/232* (2006.01)
   *H01G 4/012* (2006.01)
   *H01G 4/248* (2006.01)

(52) U.S. Cl.
   CPC ............ *H01G 4/232* (2013.01); *H01G 4/2325* (2013.01); *H01G 4/248* (2013.01)

(56) References Cited

U.S. PATENT DOCUMENTS

| | | | |
|---|---|---|---|
| 7,602,601 B2 | 10/2009 | Togashi | |
| 2003/0099085 A1 | 5/2003 | Duva | |
| 2005/0286205 A1 | 12/2005 | Togashi et al. | |
| 2007/0030628 A1* | 2/2007 | Yamamoto | H01G 4/232 |
| | | | 361/311 |
| 2007/0217123 A1 | 9/2007 | Togashi et al. | |
| 2008/0100987 A1 | 5/2008 | Togashi | |
| 2008/0186652 A1 | 8/2008 | Lee et al. | |
| 2009/0002921 A1* | 1/2009 | Ritter | H01C 1/148 |
| | | | 361/321.3 |
| 2009/0073634 A1 | 3/2009 | Lee et al. | |
| 2009/0086406 A1 | 4/2009 | Lee et al. | |
| 2010/0149769 A1 | 6/2010 | Lee et al. | |
| 2010/0206624 A1 | 8/2010 | Feichtinger | |
| 2011/0102969 A1 | 5/2011 | Togashi | |
| 2012/0050939 A1 | 3/2012 | Si et al. | |
| 2012/0134067 A1 | 5/2012 | Si et al. | |
| 2012/0298407 A1 | 11/2012 | Ahn et al. | |
| 2012/0313489 A1 | 12/2012 | Shirakawa et al. | |
| 2013/0050893 A1 | 2/2013 | Kim | |
| 2013/0050897 A1 | 2/2013 | Kim | |
| 2013/0050899 A1 | 2/2013 | Kim et al. | |
| 2014/0043719 A1 | 2/2014 | Togashi | |

FOREIGN PATENT DOCUMENTS

| | | | |
|---|---|---|---|
| CN | 102820133 A | | 12/2012 |
| JP | 2004140183 A | * | 5/2004 |
| JP | 2006-100682 A | | 4/2006 |
| JP | 2006216622 A | * | 8/2006 |
| KR | 10-0920614 B1 | | 10/2009 |
| KR | 10-2009-0117686 A | | 11/2009 |

OTHER PUBLICATIONS

U.S. Final Office Action issued in related U.S. Appl. No. 14/527,662, mailed on Jun. 10, 2015, 48 pages.

The First Office Action issued in corresponding Chinese Patent Application No. 201410592580Z, mailed on Nov. 22, 2016; with English translation.

* cited by examiner

MULTILAYER CERAMIC CAPACITOR AND BOARD HAVING THE SAME

CROSS-REFERENCE TO RELATED APPLICATION

This application is a Continuation of U.S. patent application Ser. No. 14/527,662, which in turns claims the benefit of Korean Patent Applications Nos. 10-2013-0129120 filed on Oct. 29, 2013, and 10-2014-0133068 filed on Oct. 2, 2014 with the Korean Intellectual Property Office, the disclosures of which are incorporated herein by reference.

BACKGROUND

The present disclosure relates to a multilayer ceramic capacitor and a board having the same.

In accordance with the recent trend for the miniaturization and increases in the capacitance of electronic products, demands have increasingly been made for electronic components used in electronic products to be relatively small while having high capacitance.

Among electronic components, in the case of multilayer ceramic capacitors, when equivalent series inductance (hereinafter, referred to as "ESL") increases, performance of electronic products in which the capacitors are provided may be deteriorated. In addition, in accordance with the miniaturization of the electronic products and increases in the capacitance of the electronic components, increases in ESL of the multilayer ceramic capacitors may have a relatively significant effect on deteriorations in performance of the electronic products.

Particularly, in accordance with increases in the performance of integrated circuits (IC), decoupling capacitors have been increasingly used therein. Therefore, demand for multilayer ceramic capacitors (MLCCs) having a 3-terminal vertical multilayer structure, so-called "low inductance chip capacitors (LICC)", capable of decreasing inductance in capacitors by decreasing a distance between external terminals to decrease a current flow path, has increased.

In the case of such multilayer ceramic capacitors, reliability and mounting defect rates may be significantly affected by the shapes and sizes of external electrodes.

SUMMARY

An exemplary embodiment in the present disclosure may provide a 3-terminal vertical multilayer capacitor having improved reliability and adhesion strength while low ESL characteristics are maintained, and a board having the same.

According to an exemplary embodiment in the present disclosure, a multilayer ceramic capacitor may include: three external electrodes disposed on amounting surface of a ceramic body to be spaced apart from each other and connected to lead portions of internal electrodes, wherein an interval between adjacent lead portions is 500.7 μm or less, widths of one-side margin portions of the external electrodes in a length direction of the ceramic body that are not in contact with the corresponding lead portions are 20.2 μm or more.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Exemplary embodiments in the present disclosure will now be described in detail with reference to the accompanying drawings.

The disclosure may, however, be exemplified in many different forms and should not be construed as being limited to the specific embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Directions of a hexahedral ceramic body will be defined in order to clearly describe exemplary embodiments in the present disclosure. L, W and T directions, provided in the accompanying drawings, refer to a length direction, a width direction, and a thickness direction, respectively. Here, the width direction may be used as having the same meaning as a direction in which dielectric layers are stacked.

Multilayer Ceramic Capacitor

Figure 1:
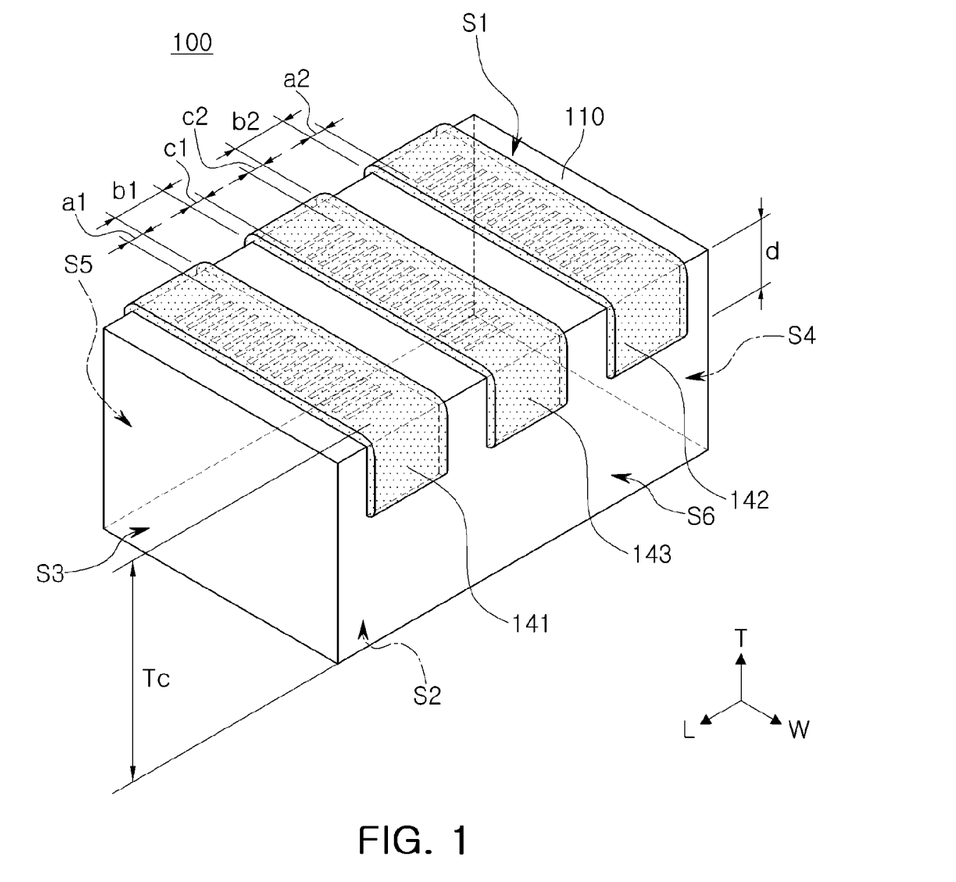
FIG. 1 is a perspective view schematically illustrating a multilayer ceramic capacitor according to an exemplary embodiment in the present disclosure in a state in which the multilayer ceramic capacitor is inverted.
Figure 2:
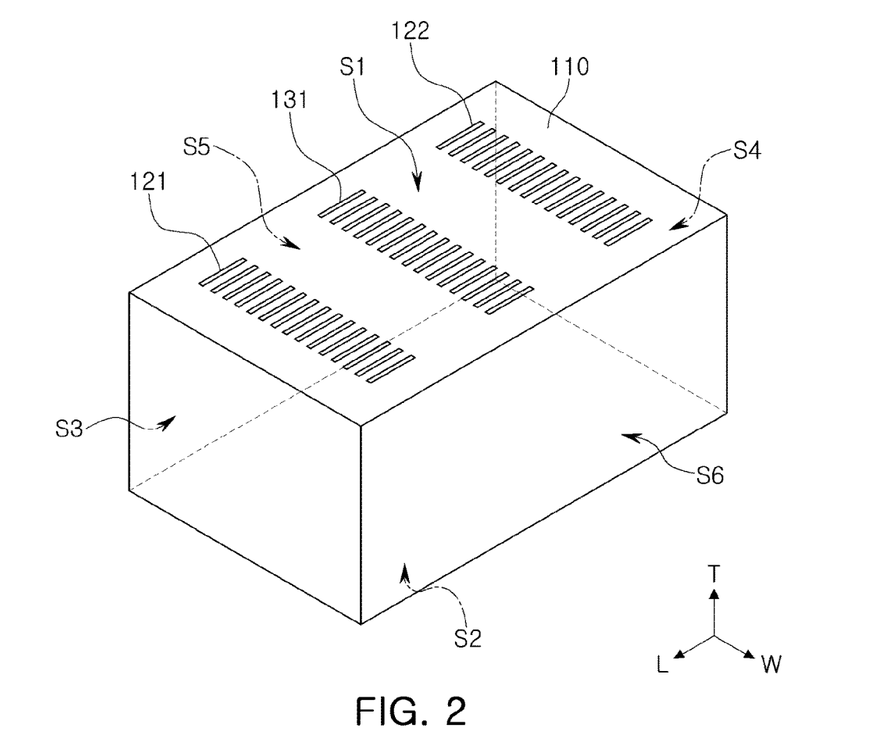
FIG. 2 is a perspective view illustrating a ceramic body of the multilayer ceramic capacitor of FIG. 1 in a state in which the ceramic body is inverted.
Figure 3:
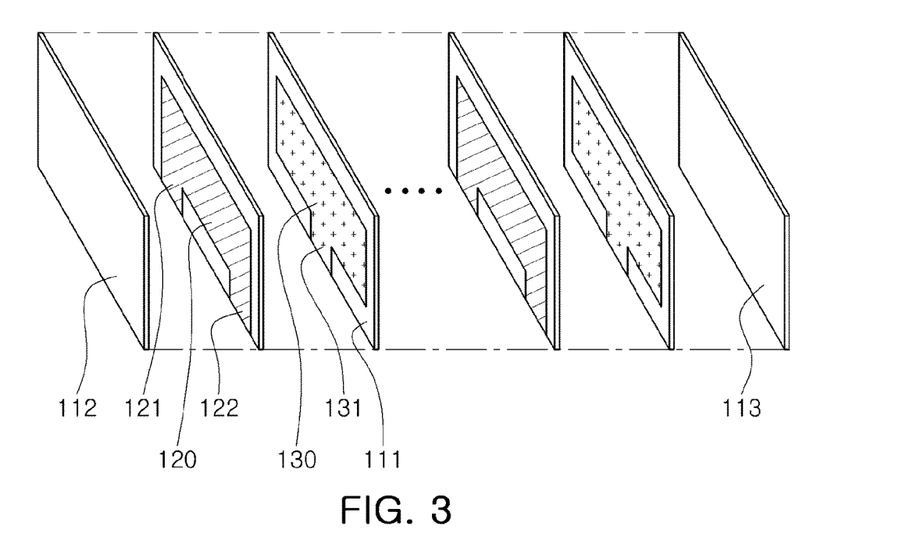
FIG. 3 is an exploded perspective view illustrating the multilayer ceramic capacitor of FIG. 1 in a state in which external electrodes thereof are omitted.
Figure 4:
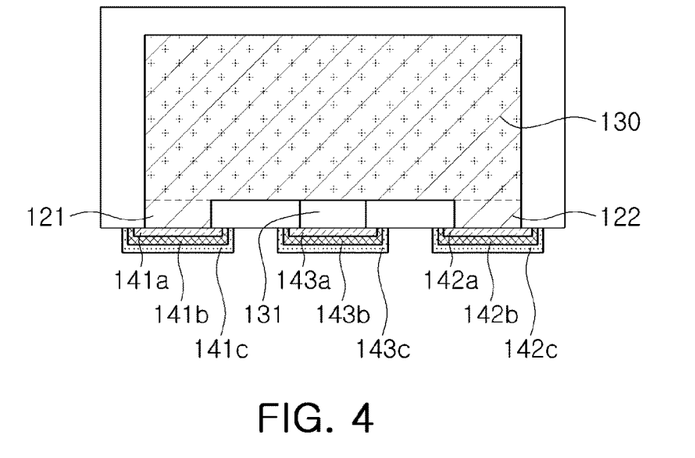
FIG. 4 is a cross-sectional view illustrating the multilayer ceramic capacitor of FIG. 1.

FIG. 1 is a perspective view schematically illustrating a multilayer ceramic capacitor according to an exemplary embodiment in the present disclosure; FIG. 2 is a perspective view illustrating a ceramic body of the multilayer ceramic capacitor of FIG. 1 in a state in which the ceramic body is inverted; FIG. 3 is an exploded perspective view illustrating the multilayer ceramic capacitor of FIG. 1 in a state in which external electrodes thereof are omitted; and FIG. 4 is a cross-sectional view illustrating the multilayer ceramic capacitor of FIG. 1.

Referring to FIGS. 1 through 4, a multilayer ceramic capacitor 100 according to the present exemplary embodiment may include a ceramic body 110 in which a plurality of dielectric layers 111 are stacked in the width direction, an active portion including a plurality of first and second internal electrodes 120 and 130, and first to third external electrodes 141 to 143.

The multilayer ceramic capacitor 100 according to the present exemplary embodiment may be a 3-terminal capacitor having a total of three external terminals.

The ceramic body 110 may have first and second surfaces S1 and S2 opposing each other in the thickness direction, fifth and sixth surfaces S5 and S6 connecting the first and second main surfaces S1 and S2 to each other and opposing each other in the width direction, and third and fourth surfaces S3 and S4 opposing each other in the length direction.

Hereinafter, in the present exemplary embodiment, a mounting surface of the multilayer ceramic capacitor 100 may be the first surface S1 of the ceramic body 110.

The ceramic body 110 may be formed by stacking the plurality of dielectric layers 111 in the width direction and then sintering the stacked dielectric layers 111, and a shape thereof is not particularly limited, but may be hexahedral as illustrated in the accompanying drawings.

However, shape and dimensions of the ceramic body 110 and the number of stacked dielectric layers 111 are not limited to those of the present exemplary embodiment illustrated in the accompanying drawings.

In addition, the plurality of dielectric layers 111 configuring the ceramic body 110 may be in a sintered state, and boundaries between the dielectric layers 111 adjacent to each other may be integrated such that they may not be readily discernible without the use of a scanning electron microscope (SEM).

The ceramic body 110 may include the active portion including the plurality of internal electrodes and contributing to capacitance formation of the capacitor and cover layers 112 and 113 disposed on both side surfaces of the active portion in the width direction as margin portions.

The active portion may be formed by alternately stacking the plurality of first and second internal electrodes 120 and 130 in the width direction, having the dielectric layers 111 interposed therebetween.

In this case, a thickness of the dielectric layers 111 may be optionally changed according to an intended degree of capacitance of the multilayer ceramic capacitor 100, but a thickness of a single dielectric layer may be preferably 0.01 to 1.00 µm after a sintering process. However, the present disclosure is not limited thereto.

Further, the dielectric layers 111 may contain a ceramic powder having high permittivity, for example, a barium titanate ($BaTiO_3$)-based powder or a strontium titanate ($SrTiO_3$)-based powder, or the like, but the material of the dielectric layers is not limited thereto as long as sufficient capacitance may be obtained.

If necessary, a ceramic additive, an organic solvent, a plasticizer, a binder, a dispersant, and the like, may be further added to the dielectric layers 111, in addition to the ceramic powder.

In this case, an average particle size of the ceramic powder used to form the dielectric layers 111 is not particularly limited and may be controlled in order to achieve the objective of the present disclosure. For example, the average particle size of the ceramic powder may be controlled to be 400 nm or less, but is not limited thereto.

The cover layers 112 and 113 may have the same material and configuration as those of the dielectric layers 111 except that internal electrodes are not included therein.

In addition, the cover layers 112 and 113 may be formed by further stacking a single dielectric layer or two or more dielectric layers on both side surfaces of the active portion in the width direction, respectively, and generally preventing the first and second internal electrodes 120 and 130 from being damaged by physical or chemical stress.

The first and second internal electrodes 120 and 130, having different polarities, may be formed in the ceramic body 110 and disposed to face each other, while having the dielectric layers 111 interposed therebetween.

In this case, the first and second internal electrodes 120 and 130 may be electrically insulated from each other by the dielectric layers 111 disposed therebetween.

The first and second internal electrodes 120 and 130 may include capacitance portions formed by overlapping the internal electrodes adjacent thereto and contributing to capacitance formation, and lead portions formed by extending portions of the capacitance portions to be exposed outwardly from the ceramic body 110.

The lead portions are not particularly limited, but may be shorter than the capacitance portion of the internal electrodes.

Further, a thickness of the first and second internal electrodes 120 and 130 may be determined according to an intended use thereof. For example, the thickness of each of the first and second internal electrodes 120 and 130 may be determined to be within a range of 0.2 µm to 1.0 µm in consideration of a size of the ceramic body 110, but is not limited thereto.

In addition, a material for forming the first and second internal electrodes 120 and 130 is not particularly limited. For example, the first and second internal electrodes 120 and 130 may be formed using a conductive paste formed of at least one of a noble metal material such as palladium (Pd), a palladium-silver (Pd—Ag) alloy, or the like, nickel (Ni), and copper (Cu).

Further, as a method for printing the conductive paste, a screen printing method, a gravure printing method, or the like, may be used, but the present disclosure is not limited thereto.

In the present exemplary embodiment, the first internal electrode 120 may have first and second lead portions 121 and 122 spaced apart from each other in the length direction and exposed to the first surface S1 of the ceramic body 110, and may be formed to be spaced apart from the third and fourth surfaces S3 and S4 by a predetermined distance.

In addition, the second internal electrode 130 may have a third lead portion 131 exposed to the first surface S1 of the ceramic body 110 and spaced apart from each of the first and second lead portions 121 and 122 by a predetermined distance between the first and second lead portions 121 and 122, and may be formed to be spaced apart from the third and fourth surfaces S3 and S4 by a predetermined distance.

In this case, the larger value of intervals (a1+b1+c1 and a2+b2+c2) between the adjacent lead portions may be 500.7 µm or less.

In a case in which the larger value of the intervals (a1+b1+c1 and a2+b2+c2) between the adjacent lead portions is greater than 500.7 μm, it may be difficult to satisfy equivalent series inductance (ESL) of 50 pH or less, such that it may be difficult to achieve low ESL.

In a general multilayer ceramic electronic component, external electrodes may be disposed on both side surfaces of a ceramic body opposing each other in a length direction.

However, in a case in which an alternating current (AC) voltage is applied to the external electrodes, a current path is relatively long, and thus a current loop may be extended, and an intensity of an induced magnetic field may be increased, whereby inductance may be increased.

In order to solve such a defect, according to an exemplary embodiment in the present disclosure, the first and second external electrodes 141 and 142 may be disposed on the first surface S1 of the ceramic body 110, and the third external electrode 143 may be disposed on the first surface S1 between the first and second external electrodes 141 and 142.

In this case, since intervals between the first and second external electrodes 141 and 142 and the third external electrode 143 may be short, the current loop may be decreased, resulting in reduced inductance.

The first and second external electrodes 141 and 142 may be formed on the first surface S1 of the ceramic body 110 to be spaced apart from each other in the length direction and may be connected to first and second lead portions 121 and 122, and the third external electrode 143 may be formed on the first surface S1 of the ceramic body 110 between the first and second external electrodes 141 and 142 to be spaced apart from the first and second external electrodes 141 and 142 by a predetermined distance and may be connected to the third lead portion 131.

In addition, the first to third external electrodes 141 to 143 may be electrically connected to the lead portions of the first and second internal electrodes 120 and 130 and disposed in positions corresponding thereto, respectively, in order to form capacitance, and if necessary, the first to third external electrodes 141 to 143 may be extended to portions of the fifth and sixth surfaces S5 and S6 of the ceramic body 110 in the width direction and the extended portions thereof form bands.

In this case, the smallest value of widths a1, a2, c1, and c2 of one-side margin portions of the first to third external electrodes 141 to 143 in the length direction of the ceramic body that are not in contact with the corresponding lead portions may be 20.2 μm or more.

In a case in which the smallest value of the widths a1, a2, c1, and c2 of the one-side margin portions of the first to third external electrodes 141 to 143 that are not in contact with the corresponding lead portions is less than 20.2 μm, high temperature load reliability and moisture resistance load reliability may be deteriorated.

Further, the smaller value of intervals b1 and b2 between the adjacent external electrodes may be 126.9 μm or more.

In a case in which the smaller value of the intervals b1 and b2 between the adjacent external electrodes is less than 126.9 μm, short-circuits may occur at the time of mounting the multilayer ceramic capacitor on a board.

In addition, heights d of the bands of the first to third external electrodes 141 to 143 may be 73.4 μm or more, respectively.

In this case, the heights d of the bands of the first to third external electrodes 141 to 143 may be equal to or less than the overall height Tc of the capacitor.

Further, in a case in which the heights d of the bands of the first to third external electrodes 141 to 143 are 73.4 μm or more, adhesion strength may be improved to prevent the occurrence of defects, and in a case in which the heights d of the bands of the first to third external electrodes 141 to 143 are less than 73.4 μm, adhesion strength defects may occur in the first to third external electrodes 141 to 143.

Meanwhile, the first to third external electrodes 141 to 143 may have a three-layer structure and include first to third conductive layers 141a to 143a in contact with the corresponding lead portions of the internal electrodes, first to third nickel (Ni) plating layers 141b to 143b formed to cover the first to third conductive layers 141a to 143a, and first to third tin (Sn) plating layers 141c to 143c formed to cover the first to third nickel plating layers 141b to 143b.

The first to third conductive layers 141a to 143a may be formed of the same conductive material as that of the first and second internal electrodes 120 and 130, but are not limited thereto. For example, the first to third conductive layers 141a to 143a may be formed of a metal powder such as copper (Cu), silver (Ag), nickel (Ni), and the like, and may be formed by applying a conductive paste prepared by adding a glass frit to the metal powder and then sintering the applied conductive paste.

Figure 5:
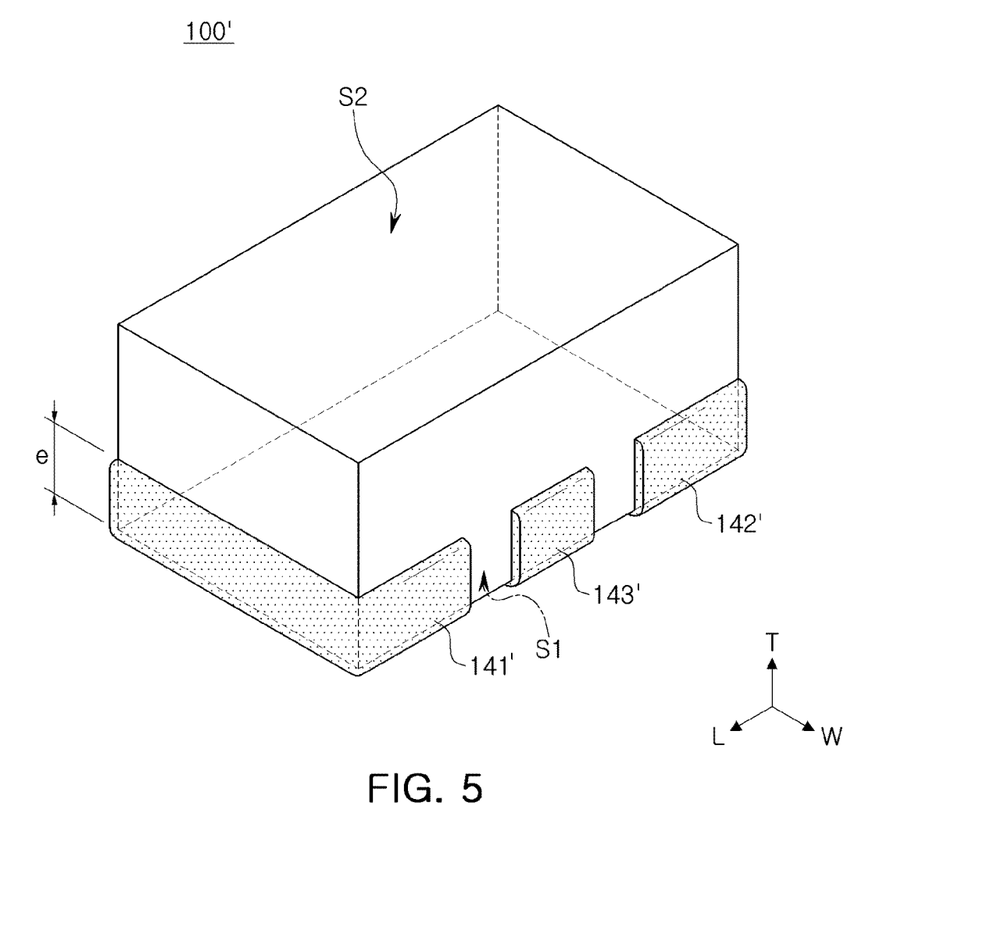
FIG. 5 is a perspective view illustrating another example of the multilayer ceramic capacitor of FIG. 1 including external electrodes having different shapes.

FIG. 5 is a perspective view illustrating a structure of a multilayer ceramic capacitor 100' including external electrodes having shapes different from those illustrated in FIG. 1.

Referring to FIG. 5, first to third external electrodes 141' to 143' may be electrically connected to the lead portions of the first and second internal electrodes 120 and 130, respectively, in order to form capacitance, and may be extended to portions of the fifth and sixth surfaces S5 and S6 of the ceramic body 110 in the width direction such that the extended portions thereof form first bands, as needed. In addition, the first and second external electrodes 141' and 142' may be extended to portions of the third and fourth surfaces S3 and S4 of the ceramic body 110 in the length direction and the extended portions thereof form second bands.

In this case, heights d of the first bands of the first to third external electrodes 141' to 143' may be 40.0 μm or more, and heights e of the second bands of the first and second external electrodes 141' and 142' may be 30.3 μm or more, respectively.

In this case, the heights d of the first bands of the first to third external electrodes 141' to 143' may be equal to or less than the overall height of the capacitor, and the heights e of the second bands of the first and second external electrodes 141' and 142' may be equal to or less than the overall height of the capacitor. That is, the sum (d+e) of the heights of the first band and the second band may be equal to or less than two times the overall height of the capacitor.

Further, in a case in which the sum of the heights d of the first bands of the first to third external electrodes 141' to 143' and the heights e of the second bands of the first and second external electrodes 141' and 142' is less than 64.1 μm, adhesion strength defects may occur in the first to third external electrodes 141' to 143'.

Experimental Example

Multilayer ceramic capacitors according to Inventive and Comparative Examples were manufactured as follows.

Slurry containing a powder such as a barium titanate ($BaTiO_3$) powder, or the like, was applied to carrier films and then dried to prepare a plurality of ceramic green sheets having a thickness of 1.8 μm.

Next, first and second internal electrodes were formed by applying a conductive paste for nickel internal electrodes to the ceramic green sheets using a screen, each first internal electrode having first and second lead portions exposed to a side (first main surface) of a corresponding ceramic green sheet and each second internal electrode having a third lead portion spaced apart from the first and second lead portions and exposed to a side (first main surface) of a corresponding ceramic green sheet.

Then, about 200 ceramic green sheets were stacked, and one or more ceramic green sheets on which the first and second internal electrodes were not formed were further stacked on both side surfaces of the stacked ceramic green sheets in a width direction, thereby manufacturing a multilayer body. Thereafter, isostatic pressing was performed on the multilayer body at 85° C. and a pressure of 1000 kgf/cm².

Next, the pressed ceramic multilayer body was cut into individual chips, and each chip was subjected to a debinding process by maintaining at a temperature of 230° C. for 60 hours under air atmosphere.

Next, the chip was sintered at a temperature of about 1200° C. under reducing atmosphere having an oxygen partial pressure of $10^{-11}$ to $10^{-10}$ atm lower than a Ni/NiO balanced oxygen partial pressure to prevent the internal electrodes from being oxidized, thereby preparing a ceramic body.

A chip size of the multilayer chip capacitor after being sintered was about 1.6 mm×0.8 mm (Length×Width (L×W), 1608 size). Here, a manufacturing tolerance was determined to be within a range of ±0.1 mm (length=width (L×W)).

Thereafter, a process of forming first to third external electrodes was performed on the first surface of the ceramic body so as to correspond to lead portions of the first and second internal electrodes, respectively, to thereby complete a multilayer ceramic capacitor. Then, tests for measuring the presence or absence of defects occurring at the time of high temperature/moisture resistance loading, short defect rates at the time of mounting the capacitor, the presence or absence of adhesion strength defects, and equivalent serial inductance (ESL) were performed. The test results are provided in Table 1. Each of the tests was performed on 100 test samples.

TABLE 1

| No | a1 | a2 | b1 | b2 | c1 | c2 | d | e | d + e | max (a1 + b1 + c1, a2 + b2 + c2) | min (a1, a2, c1, c2) | min (b1, b2) | ESL | NG rate at Time of High Temperature Loading/Moisture Resistance Loading | Short-Circuit Defect Rate at the Time of Mounting | Adhesion Strength NG rate |
|---|---|---|---|---|---|---|---|---|---|---|---|---|---|---|---|---|
| 1* | 10.4 um | 11.3 um | 277.2 um | 272.5 um | 11.6 um | 12.4 um | 147.2 um | 0.0 um | 147.2 um | 299.4 um | 10.4 um | 272.5 um | 38.2 pH | 3/800 | 0/100 | 0/10 |
| 2 | 21.2 um | 20.4 um | 258.4 um | 254.0 um | 20.2 um | 22.1 um | 147.7 um | 0.0 um | 147.7 um | 299.8 um | 20.2 um | 254.0 um | 38.5 pH | 0/800 | 0/100 | 0/10 |
| 3 | 50.6 um | 48.2 um | 196.8 um | 208.2 um | 49.7 um | 49.0 um | 148.1 um | 0.0 um | 148.1 um | 300.4 um | 48.2 um | 196.6 um | 38.0 pH | 0/800 | 0/100 | 0/10 |
| 4 | 86.4 um | 86.1 um | 126.9 um | 128.1 um | 85.4 um | 86.0 um | 148.2 um | 0.0 um | 148.2 um | 300.2 um | 85.4 um | 126.9 um | 38.5 pH | 0/800 | 0/100 | 0/10 |
| 5* | 104.2 um | 102.6 um | 95.7 um | 96.2 um | 100.1 um | 101.7 um | 147.9 um | 0.0 um | 147.9 um | 300.7 um | 100.1 um | 95.7 um | 38.1 pH | 0/800 | 47/100 | 0/10 |
| 6* | 10.5 um | 11.1 um | 377.3 um | 372.9 um | 11.5 um | 12.1 um | 148.0 um | 0.0 um | 148.0 um | 399.3 um | 10.5 um | 372.9 um | 46.7 pH | 2/800 | 0/100 | 0/10 |
| 7 | 20.9 um | 20.5 um | 358.5 um | 354.1 um | 20.7 um | 21.5 um | 148.4 um | 0.0 um | 148.4 um | 400.0 um | 20.5 um | 354.1 um | 43.6 pH | 0/800 | 0/100 | 0/10 |
| 8 | 50.8 um | 48.0 um | 297.1 um | 303.4 um | 49.5 um | 48.6 um | 148.3 um | 0.0 um | 148.3 um | 400.1 um | 48.0 um | 297.1 um | 45.5 pH | 0/800 | 0/100 | 0/10 |
| 9 | 86.4 um | 86.0 um | 227.2 um | 228.3 um | 85.5 um | 85.7 um | 148.1 um | 0.0 um | 148.1 um | 400.0 um | 85.5 um | 227.2 um | 44.0 pH | 0/800 | 0/100 | 0/10 |
| 10 | 104.0 um | 103.1 um | 195.6 um | 196.5 um | 99.9 um | 101.7 um | 148.1 um | 0.0 um | 148.1 um | 401.3 um | 99.9 um | 195.6 um | 43.7 pH | 0/800 | 0/100 | 0/10 |
| 11* | 10.1 um | 10.6 um | 477.6 um | 473.0 um | 11.8 um | 12.5 um | 147.6 um | 0.0 um | 147.6 um | 499.5 um | 10.1 um | 473.0 um | 48.2 pH | 5/800 | 0/100 | 0/10 |
| 12 | 20.6 um | 20.7 um | 458.6 um | 454.1 um | 20.6 um | 22.1 um | 148.3 um | 0.0 um | 148.3 um | 499.9 um | 20.6 um | 454.1 um | 46.3 pH | 0/800 | 0/100 | 0/10 |
| 13 | 50.9 um | 48.3 um | 397.3 um | 403.3 um | 49.9 um | 48.3 um | 148.4 um | 0.0 um | 148.4 um | 499.8 um | 48.3 um | 397.3 um | 48.8 pH | 0/800 | 0/100 | 0/20 |
| 14 | 86.5 um | 86.4 um | 327.3 um | 328.1 um | 85.3 um | 85.7 um | 148.1 um | 0.0 um | 148.1 um | 500.2 um | 85.3 um | 327.3 um | 49.3 pH | 0/800 | 0/100 | 0/10 |
| 15 | 103.7 um | 102.6 um | 295.9 um | 296.2 um | 100.0 um | 101.9 um | 148.2 um | 0.0 um | 148.2 um | 500.7 um | 100.0 um | 295.9 um | 46.3 pH | 0/800 | 0/100 | 0/10 |
| 16* | 9.7 um | 11.0 um | 577.3 um | 572.7 um | 12.3 um | 12.8 um | 147.5 um | 0.0 um | 147.5 um | 599.3 um | 9.7 um | 572.7 um | 57.0 pH | 1/800 | 0/100 | 0/10 |
| 17* | 20.3 um | 20.4 um | 559.1 um | 554.2 um | 20.4 um | 22.5 um | 148.0 um | 0.0 um | 148.0 um | 599.8 um | 20.3 um | 554.2 um | 57.4 pH | 0/800 | 0/100 | 0/10 |
| 18* | 50.7 um | 48.2 um | 496.9 um | 503.4 um | 49.7 um | 48.6 um | 148.1 um | 0.0 um | 148.1 um | 600.2 um | 48.2 um | 496.9 um | 57.5 pH | 0/800 | 0/100 | 0/10 |
| 19* | 86.4 um | 86.3 um | 427.7 um | 427.6 um | 85.4 um | 85.9 um | 148.1 um | 0.0 um | 148.1 um | 599.8 um | 65.4 um | 427.6 um | 58.2 pH | 0/800 | 0/100 | 0/10 |
| 20* | 103.2 um | 102.8 um | 395.8 um | 596.2 um | 100.3 um | 102.0 um | 147.8 um | 0.0 um | 147.8 um | 601.0 um | 100.3 um | 395.8 um | 57.3 pH | 0/800 | 0/100 | 0/10 |
| 21 | 50.7 um | 48.3 um | 196.6 um | 203.1 um | 49.8 um | 49.0 um | 110.3 um | 0.0 um | 110.3 um | 300.3 um | 48.3 um | 196.6 um | 39.1 pH | 0/800 | 0/100 | 0/10 |
| 22 | 50.8 um | 48.0 um | 196.7 um | 203.4 um | 50.2 um | 49.1 um | 73.4 um | 0.0 um | 73.4 um | 300.4 um | 48.0 um | 196.7 um | 39.2 pH | 0/800 | 0/100 | 0/10 |
| 23* | 51.0 um | 47.6 um | 196.9 um | 203.0 um | 49.8 um | 49.4 um | 49.4 um | 0.0 um | 49.4 um | 300.0 um | 47.6 um | 196.9 um | 39.2 pH | 0/800 | 0/100 | 2/10 |
| 24* | 51.1 um | 47.5 um | 197.3 um | 203.0 um | 49.5 um | 49.1 um | 0.0 um | 0.0 um | 0.0 um | 299.7 um | 47.5 um | 197.3 um | 39.1 pH | 0/800 | 0/100 | 10/10 |
| 25* | 51.1 um | 47.2 um | 197.0 um | 203.0 um | 49.5 um | 48.6 um | 39.8 um | 15.2 um | 55.0 um | 298.7 um | 47.2 um | 197.0 um | 38.9 pH | 0/800 | 0/100 | 6/10 |
| 26 | 51.4 um | 47.3 um | 196.7 um | 203.2 um | 49.1 um | 45.3 um | 40.0 um | 30.3 um | 70.3 um | 298.9 um | 47.3 um | 196.7 um | 39.3 pH | 0/800 | 0/100 | 0/10 |
| 27 | 51.8 um | 46.9 um | 196.7 um | 202.9 um | 48.6 um | 47.9 um | 39.6 um | 66.4 um | 106.0 um | 297.7 um | 46.9 um | 196.7 um | 39.3 pH | 0/800 | 0/100 | 0/10 |
| 28 | 51.7 um | 47.1 um | 197.2 um | 202.8 um | 48.3 um | 47.5 um | 39.4 um | 102.4 um | 141.8 um | 297.4 um | 47.1 um | 197.2 um | 39.6 pH | 0/800 | 0/100 | 0/10 |
| 29 | 51.2 um | 46.9 um | 196.9 um | 203.0 um | 49.2 um | 48.7 um | 48.8 um | 15.3 um | 64.1 um | 296.6 um | 46.9 um | 196.9 um | 39.4 pH | 0/800 | 0/100 | 0/10 |
| 30 | 50.9 um | 47.2 um | 196.7 um | 202.8 um | 49.7 um | 48.7 um | 48.7 um | 30.3 um | 78.9 um | 298.7 um | 47.2 um | 196.7 um | 39.6 pH | 0/800 | 0/100 | 0/10 |
| 31 | 50.9 um | 47.6 um | 197.1 um | 203.0 um | 49.7 um | 48.6 um | 48.6 um | 66.8 um | 115.5 um | 299.1 um | 47.6 um | 197.1 um | 39.4 pH | 0/800 | 0/100 | 0/10 |
| 32 | 51.0 um | 47.8 um | 196.7 um | 203.2 um | 49.6 um | 48.8 um | 48.8 um | 101.9 um | 150.7 um | 299.6 um | 47.8 um | 196.7 um | 39.6 pH | 0/800 | 0/100 | 0/10 |
| 33 | 51.2 um | 47.8 um | 196.3 um | 203.1 um | 49.8 um | 48.4 um | 72.3 um | 15.4 um | 87.7 um | 299.2 um | 47.8 um | 196.3 um | 39.5 pH | 0/800 | 0/100 | 0/10 |
| 34 | 51.5 um | 47.4 um | 196.5 um | 203.3 um | 49.6 um | 48.7 um | 72.7 um | 30.1 um | 102.9 um | 299.4 um | 47.4 um | 196.5 um | 39.0 pH | 0/800 | 0/100 | 0/10 |
| 35 | 51.5 um | 47.8 um | 196.9 um | 203.0 um | 49.8 um | 48.2 um | 73.0 um | 67.3 um | 140.2 um | 299.0 um | 47.8 um | 196.9 um | 39.2 pH | 0/800 | 0/100 | 0/10 |
| 36 | 51.6 um | 47.9 um | 197.4 um | 202.6 um | 49.8 um | 48.2 um | 73.4 um | 101.9 um | 175.4 um | 298.8 um | 47.9 um | 197.4 um | 39.0 pH | 0/800 | 0/100 | 0/10 |

* (1): NG Rate at Time of High Temperature Loading/Moisture Resistance Loading
(2): Short-Circuit Defect Rate at the Time of Mounting
(3): Adhesion Strength NG Rate Referring to Table 1, it can be seen that preferably, the maximum value (max(a1+b1+c1, a2+b2+c2)) of intervals between the adjacent lead portions was 500.7 μm or less, and in cases of samples 16 to 20 in which the maximum value (max(a1+b1+c1, a2+b2+c2)) of the intervals between the adjacent lead portions was greater than 500.7 μm, ESL was greater than 50 pH, and thus, it was difficult to obtain low ESL.

In this case, the minimum of the smaller value of the intervals a1+b1+c1 and a2+b2+c2 between the adjacent lead portions may be equal to the sum of the minimum of the smaller value of the intervals b1 and b2 between the adjacent external electrodes and the minimum of the smaller value of widths a1+c1 and a2+c2 of the one-side margin portions of the external electrodes in the length direction of the ceramic body that are not in contact with the lead portions. Accordingly, the smaller value of the intervals a1+b1+c1 and a2+b2+c2 between the adjacent lead portions may preferably be 167.3 μm or more.

Further, it can be seen that preferably, the minimum value (min(a1, a2, c1, c2)) of the widths of the one-side margin portions of the first to third external electrodes 141 to 143 that are not in contact with the lead portions was 20.2 μm or more, and in the cases of samples 1, 6, 11, and 16 in which the minimum value (min (a1, a2, c1, c2)) of the widths of the one-side margin portions of the first to third external electrodes 141 to 143 that are not in contact with the lead portions was less than 20.2 μm, high temperature load reliability and moisture resistance load reliability were deteriorated.

In this case, the maximum of the largest value of the widths a1, a2, c1 and c2 of the one-side margin portions of the external electrodes that are not in contact with the lead portions may be equal to a half of a value obtained by subtracting the minimum of the smaller value of the intervals b1 and b2 between the adjacent external electrodes from the maximum (max(a1+b1+c1, a2+b2+c2)) of the larger value of the intervals between the adjacent lead portions.

Accordingly, the largest value of the widths a1, a2, c1, and c2 of the one-side margin portions of the external electrodes that are not in contact with the lead portions may be 186.9 μm or less.

In addition, it can be seen that preferably, the larger value of the intervals b1 and b2 between the adjacent external electrodes was 126.9 μm or more, and in the case of sample 5 in which the larger value of the intervals b1 and b2 between the adjacent external electrodes was less than 126.9 μm, short-circuit defects occurred at the time of mounting the multilayer ceramic capacitor on a board.

In this case, the maximum of the larger value of the intervals b1 and b2 between the adjacent external electrodes may be equal to a value obtained by subtracting a value equal to twice the minimum of the smallest value of the widths a1, a2, c1, and c2 of the one-side margin portions of the external electrodes that are not in contact with the lead portions, from the maximum of the larger value of the intervals a1+b1+c1 and a2+b2+c2 between the adjacent lead portions. Therefore, the maximum of the larger value of the intervals b1 and b2 between the adjacent external electrodes may be 460.3 μm or less.

Further, it can be seen that preferably, the first to third external electrodes 141 to 143 had bands extended to portions of the fifth and sixth surfaces S5 and S6 of the ceramic body 110 in the width direction and the heights d of the bands were preferably 73.4 μm.

In the case of sample 23 in which the heights d of the bands of the first to third external electrodes 141 to 143 were less than 73.4 μm, an adhesion strength defect occurred.

Meanwhile, samples 25 to 36 had structures in which the first to third external electrodes 141 to 143 had first bands extended to portions of the fifth and sixth surfaces S5 and S6 of the ceramic body 110 in the width direction, and the first and second external electrodes 141 and 142 had second bands extended to portions of the third and fourth surfaces S3 and S4 of the ceramic body 110 in the length direction.

In this case, referring to samples 26 to 36, it can be seen that the sum of the heights d of the first bands of the first to third external electrodes 141 to 143 and the heights e of the second bands of the first and second external electrodes 141 and 142 was 64.1 μm or more when the adhesion strength defects of the external electrodes did not occur.

In the case of sample 25 in which the sum (d+e) of the heights of the first band and the second band was less than 64.1 μm, an adhesion strength defect occurred.

Modified Example

Figure 6:
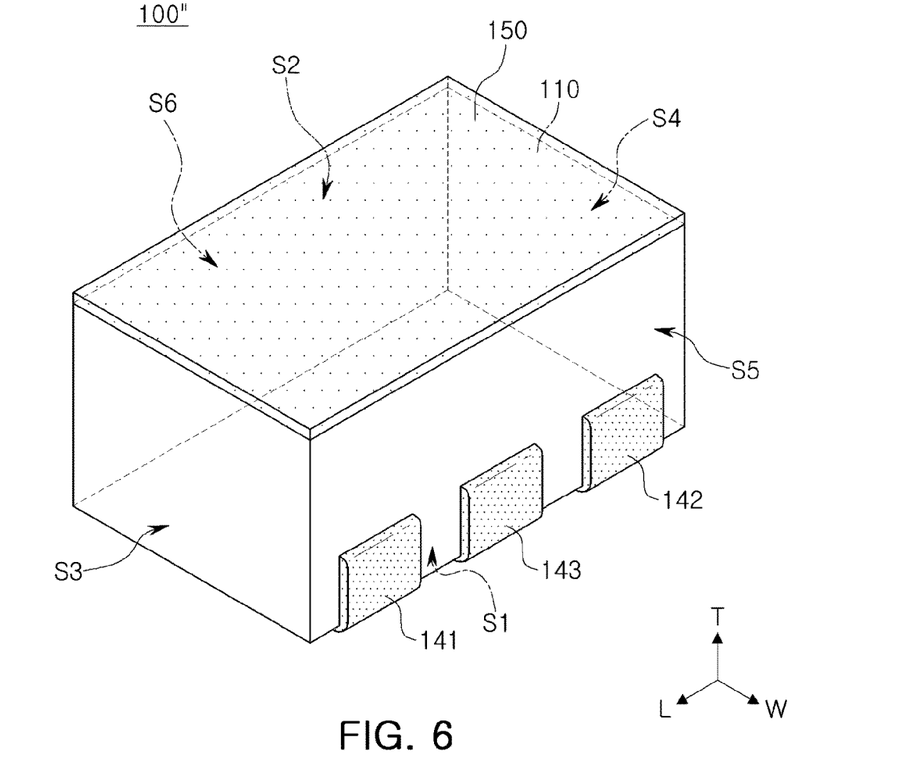
FIG. 6 is a perspective view schematically illustrating a multilayer ceramic capacitor according to another exemplary embodiment in the present disclosure.
Figure 7:
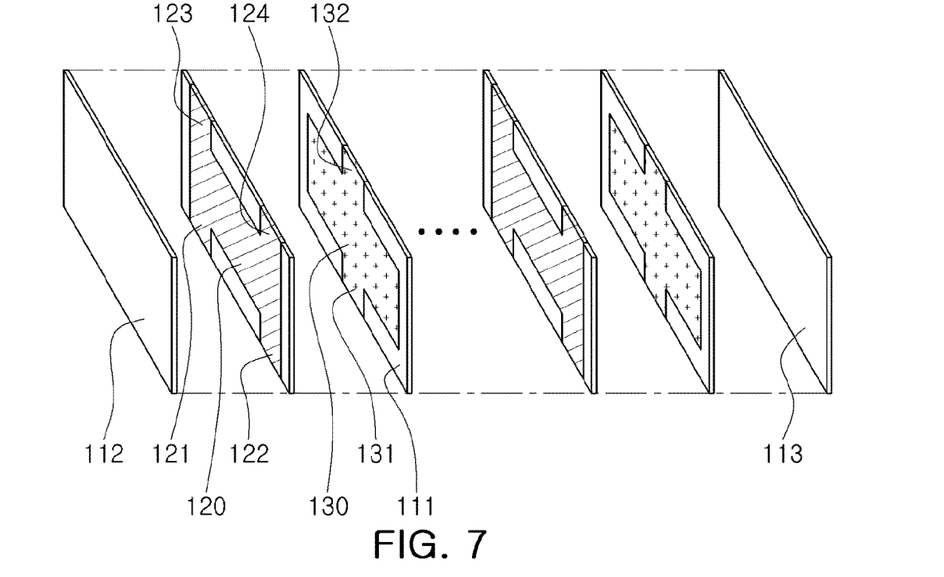
FIG. 7 is an exploded perspective view illustrating the multilayer ceramic capacitor of FIG. 6 in a state in which external electrodes thereof are omitted.

FIG. 6 is a perspective view schematically illustrating a multilayer ceramic capacitor according to another exemplary embodiment in the present disclosure, and FIG. 7 is an exploded perspective view illustrating the multilayer ceramic capacitor of FIG. 6 in a state in which external electrodes thereof are omitted.

Here, since the structure of the ceramic body 110 is the same as that in the previous exemplary embodiment, a detailed description thereof will be omitted in order to avoid redundancy, and structures of first and second internal electrodes 120 and 130 different from those in the previous exemplary embodiment and an insulating layer 150 will be described in detail.

Referring to FIGS. 6 and 7, in a multilayer ceramic capacitor 100" according to the present exemplary embodiment, the insulating layer 150 may be disposed on the second surface S2 of the ceramic body 110 opposing the mounting surface of the ceramic body 110.

The first internal electrode 120 may have fourth and fifth lead portions 123 and 124 exposed to the second surface S2 of the ceramic body 110 to come into contact with the insulating layer 150 formed on the second surface S2 of the ceramic body 110.

The second internal electrode 130 may have a sixth lead portion 132 disposed between the fourth and fifth lead portions 123 and 124 and exposed to the second surface S2 of the ceramic body 110 to come into contact with the insulating layer 150.

Figure 8:
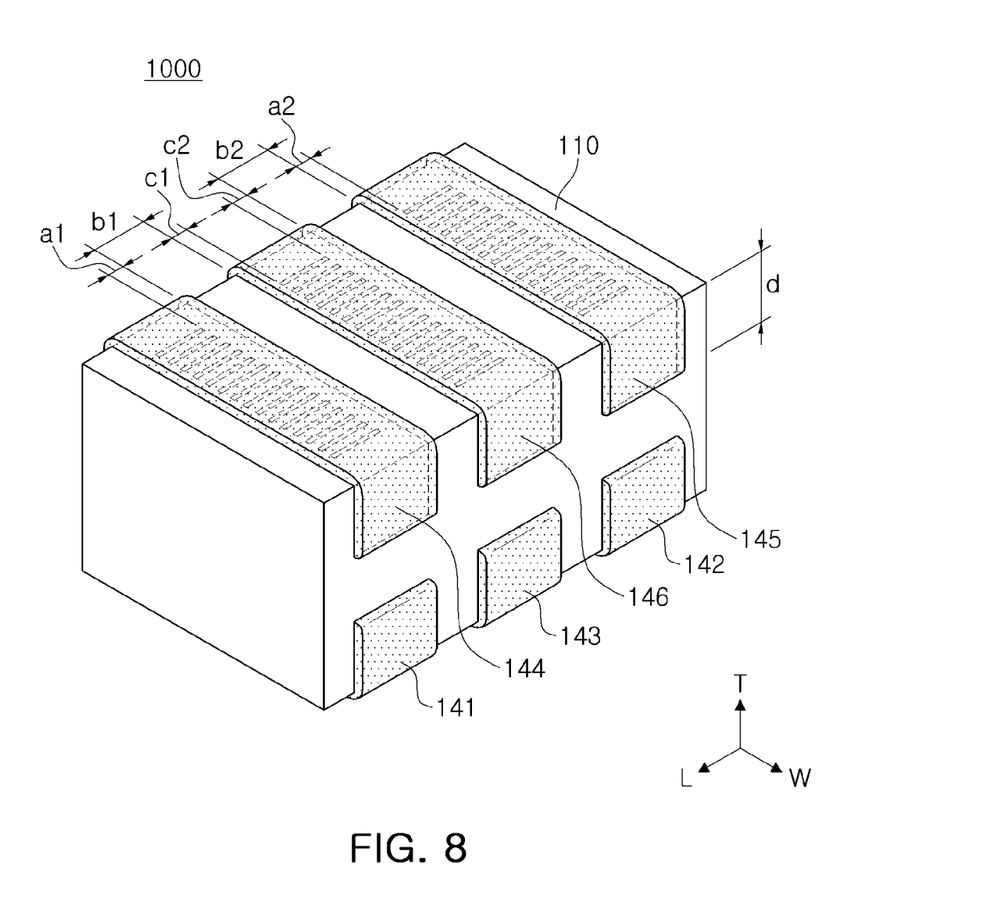
FIG. 8 is a perspective view schematically illustrating a multilayer ceramic capacitor according to another exemplary embodiment in the present disclosure.
Figure 9:
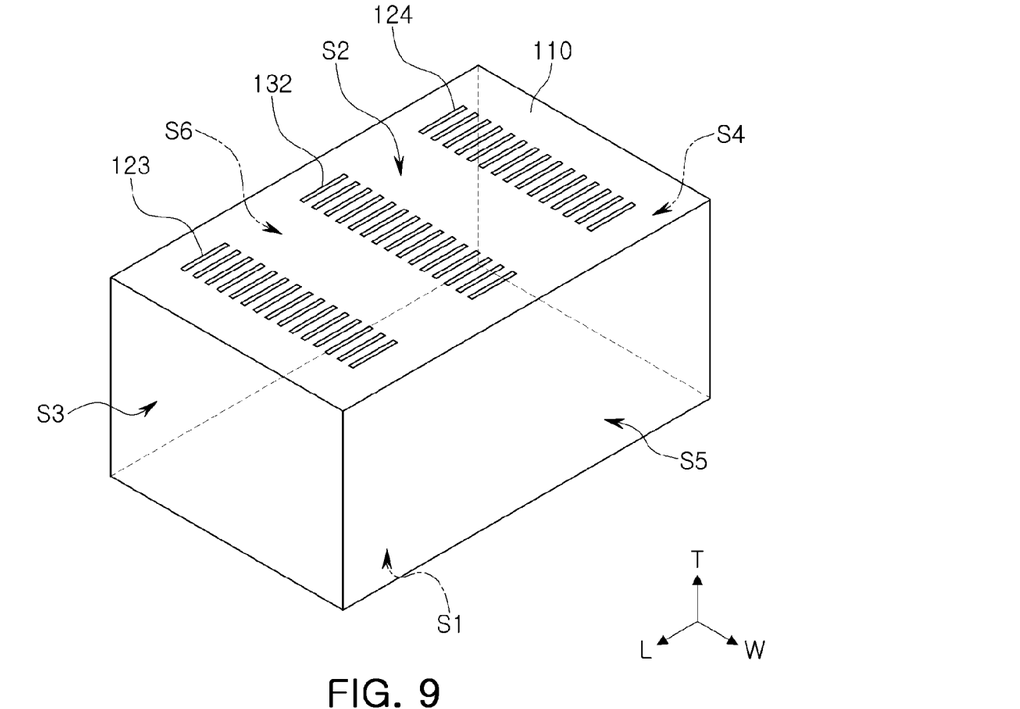
FIG. 9 is a perspective view illustrating a ceramic body of the multilayer ceramic capacitor of FIG. 8.
Figure 10:
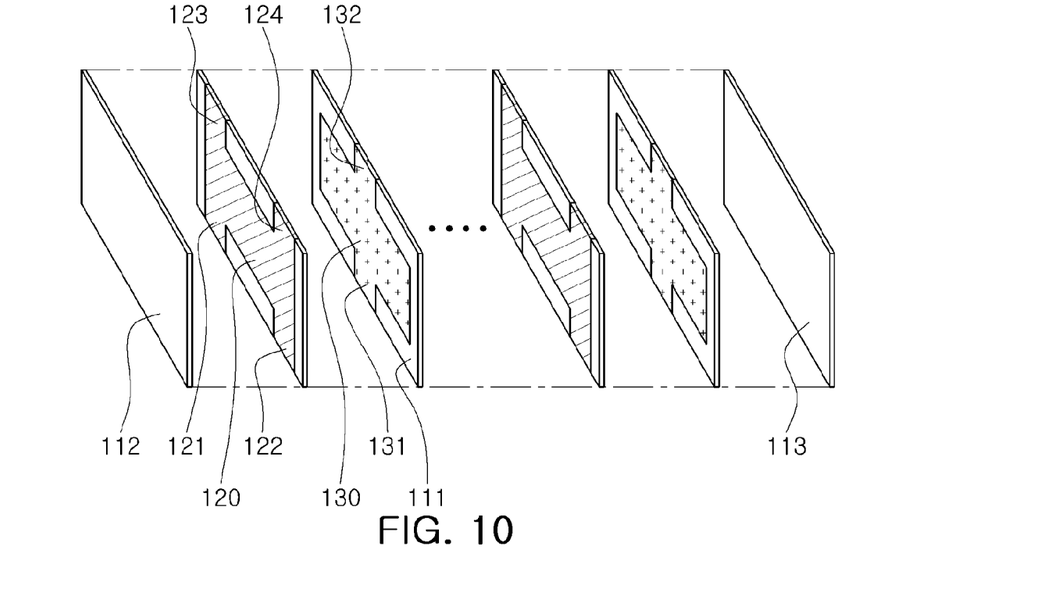
FIG. 10 is an exploded perspective view illustrating the multilayer ceramic capacitor of FIG. 8 in a state in which external electrodes thereof are omitted.
Figure 11:
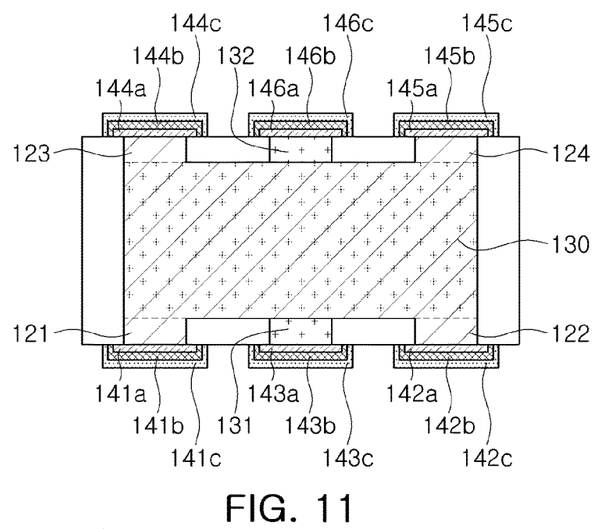
FIG. 11 is a cross-sectional view illustrating the multilayer ceramic capacitor of FIG. 8.

FIG. 8 is a perspective view schematically illustrating a multilayer ceramic capacitor according to another exemplary embodiment in the present disclosure; FIG. 9 is a perspective view illustrating a ceramic body of the multilayer ceramic capacitor of FIG. 8; FIG. 10 is an exploded perspective view illustrating the multilayer ceramic capacitor of FIG. 8 in a state in which external electrodes thereof are omitted; and FIG. 11 is a cross-sectional view illustrating the multilayer ceramic capacitor of FIG. 8.

Here, since the structure of the ceramic body 110 is the same as that in the previous exemplary embodiment, a detailed description thereof will be omitted in order to avoid redundancy, and structures of fourth to sixth external electrodes 144 to 146 and first and second internal electrodes 120 and 130 different from those in the previous exemplary embodiment will be described in detail.

Referring to FIGS. 8 through 11, a multilayer ceramic capacitor 1000 according to the present exemplary embodiment, the fourth to sixth external electrodes 144 to 146 may be disposed on the second surface S2 of the ceramic body 110 so as to face the first to third external electrodes 141 to 143.

In this case, the fourth to sixth external electrodes 144 to 146 may be extended to portions of the fifth and sixth surfaces S5 and S6 of the ceramic body 110 in the width direction, as needed.

The fourth to sixth external electrodes 144 to 146 may have a three-layer structure and include fourth to sixth conductive layers 144a to 146a in contact with the lead portions of the internal electrodes disposed in positions corresponding to the conductive layers, respectively, fourth to sixth nickel (Ni) plating layers 144b to 146b formed to cover the fourth to sixth conductive layers 144a to 146a, respectively, and fourth to sixth tin (Sn) plating layers 144c to 146c formed to cover the fourth to sixth nickel plating layers 144b to 146b, respectively.

The first internal electrode 120 may have the fourth and fifth lead portions 123 and 124 exposed to the second surface S2 of the ceramic body 110 to thereby be connected to the fourth and fifth external electrodes 144 and 145 formed on the second surface S2 of the ceramic body 110, respectively.

The second internal electrode 130 may have the sixth lead portion 132 disposed between the fourth and fifth lead portions 123 and 124 and exposed to the second surface S2 of the ceramic body 110 to thereby be connected to the sixth external electrode 146.

As described above, in the case in which the internal and external structures of the multilayer ceramic capacitor 1000 are formed to be vertically symmetrical, directionality of the capacitor may be removed.

That is, the multilayer ceramic capacitor 1000 has a vertically symmetrical structure, such that, a defect occurring when amounting surface is reversed at the time of mounting the multilayer ceramic capacitor 1000 on a board may be prevented.

Therefore, since any surface of the first and second surfaces S1 and S2 of the multilayer ceramic capacitor 1000 is used as a mounting surface, there is no need to consider a direction of the mounting surface at the time of mounting the multilayer ceramic capacitor 1000 on the board.

In this case, the smallest value of the widths a1, a2, c1, and c2 of one-side margin portions of the fourth to sixth external electrodes 144 to 146 in the length direction of the ceramic body that are not in contact with the corresponding lead portions may be 20.2 μm or more.

In a case in which the smallest value of the widths a1, a2, c1, and c2 of the one-side margin portions of the fourth to sixth external electrodes 144 to 146 that are not in contact with the corresponding lead portions is less than 20.2 μm, high temperature load reliability and moisture resistance load reliability may be deteriorated.

In addition, the smaller value of intervals b1 and b2 between the adjacent external electrodes may be 126.9 μm or more.

In a case in which the smaller value of the intervals b1 and b2 between the adjacent external electrodes is less than 126.9 μm, short-circuits may occur at the time of mounting the multilayer ceramic capacitor on a board.

In addition, heights d of bands of the fourth to sixth external electrodes 144 to 146 may be 73.4 μm or more, respectively.

In a case in which the heights d of the bands of the fourth to sixth external electrodes 144 to 146 are 73.4 μm or more, adhesion strength may be improved, such that adhesion strength defects may not occur, and in a case in which the heights d of the bands of the fourth to sixth external electrodes 144 to 146 are less than 73.4 ram, adhesion strength defects may occur in the fourth to sixth external electrodes 144 to 146.

Figure 12:
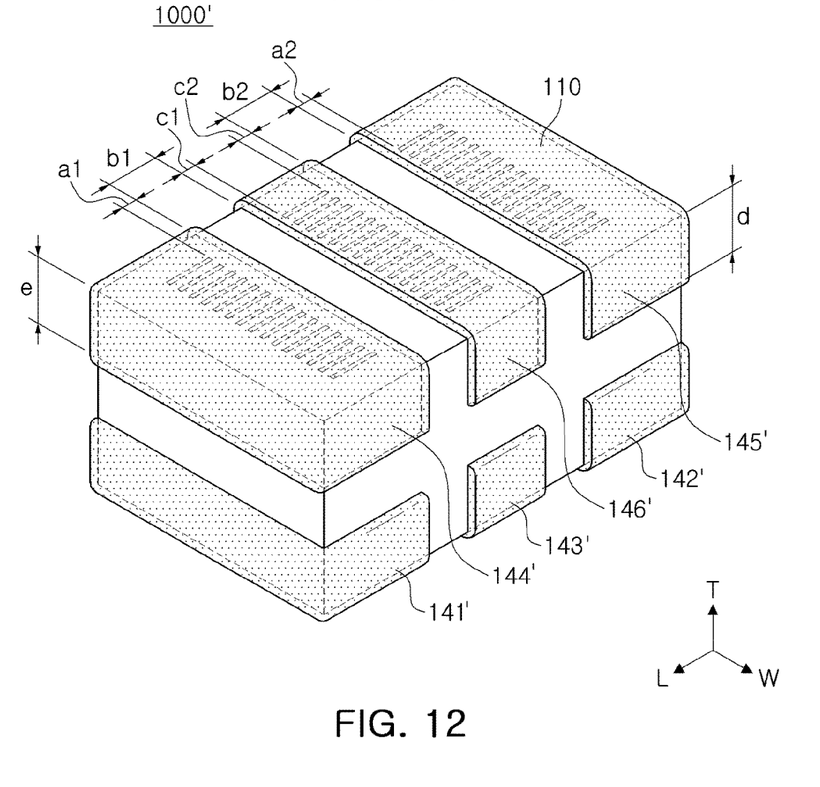
FIG. 12 is a perspective view illustrating another example of the multilayer ceramic capacitor of FIG. 8 including external electrodes having different shapes.

FIG. 12 is a perspective view illustrating a structure of a multilayer ceramic capacitor 1000' including external electrodes having shapes different from those illustrated in FIG. 8.

Referring to FIG. 12, fourth to sixth external electrodes 144' to 146' may be electrically connected to the corresponding lead portions of the first and second internal electrodes 120 and 130, respectively, in order to form capacitance and may be extended to portions of the fifth and sixth surfaces S5 and S6 of the ceramic body 110 in the width direction to form first bands, as needed. In addition, the fourth and fifth external electrodes 144' and 145' may be extended to portions of the third and fourth surfaces S3 and S4 of the ceramic body 110 in the length direction to form second bands, as needed.

In this case, heights d of the first bands of the fourth to sixth external electrodes 144' to 146' may be 40.0 μm or more, respectively, and heights e of the second bands of the fourth and fifth external electrodes 144' and 145' may be 30.3 μm or more, respectively.

In a case in which the sum of the heights d of the first bands of the fourth to sixth external electrodes 144' to 146' and the heights e of the second bands of the fourth and fifth external electrodes 144' and 145' is less than 64.1 μm, adhesion strength defects may occur in the fourth to sixth external electrodes 144' to 146'.

Meanwhile, thicknesses of the conductive layers and the plating layers of the first to third external electrodes, the results obtained by testing for the presence or absence of a defect occurring at the time of high temperature/moisture resistance loading, a short defect rate at the time of mounting the capacitor, the presence or absence of adhesion strength defects, and by measuring equivalent serial inductance (ESL), as illustrated in Table 1, may be equally applied to the fourth to sixth external electrodes.

Board Having Multilayer Ceramic Capacitor

Figure 13:
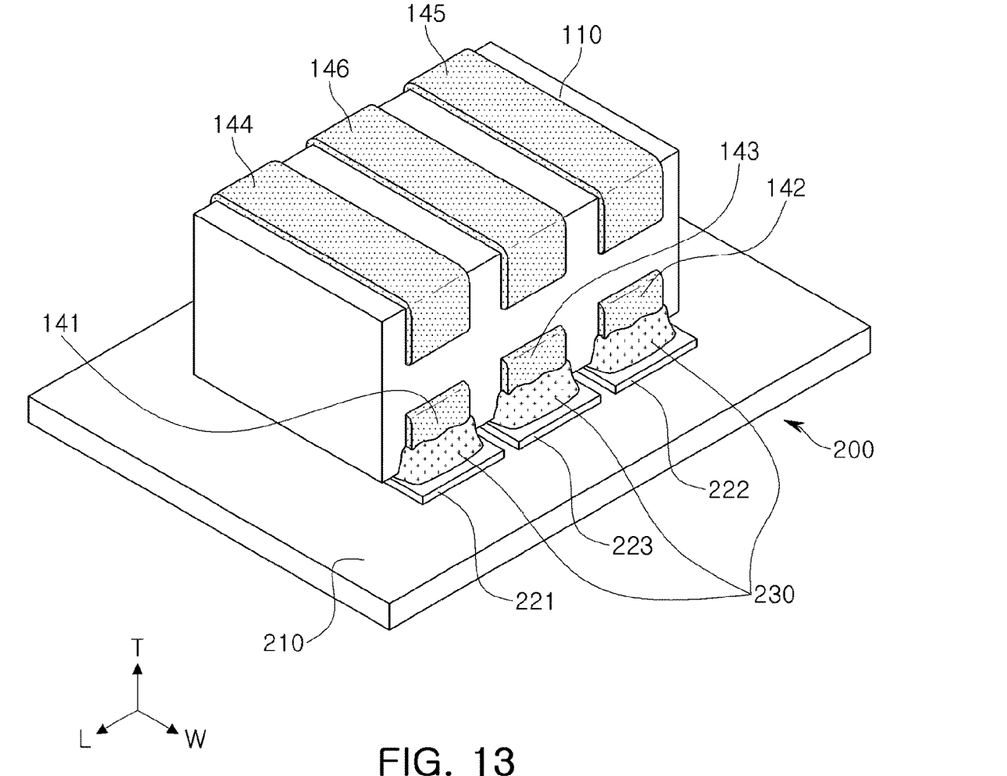
FIG. 13 is a perspective view illustrating a board on which the multilayer ceramic capacitor of FIG. 8 is mounted.
Figure 14:
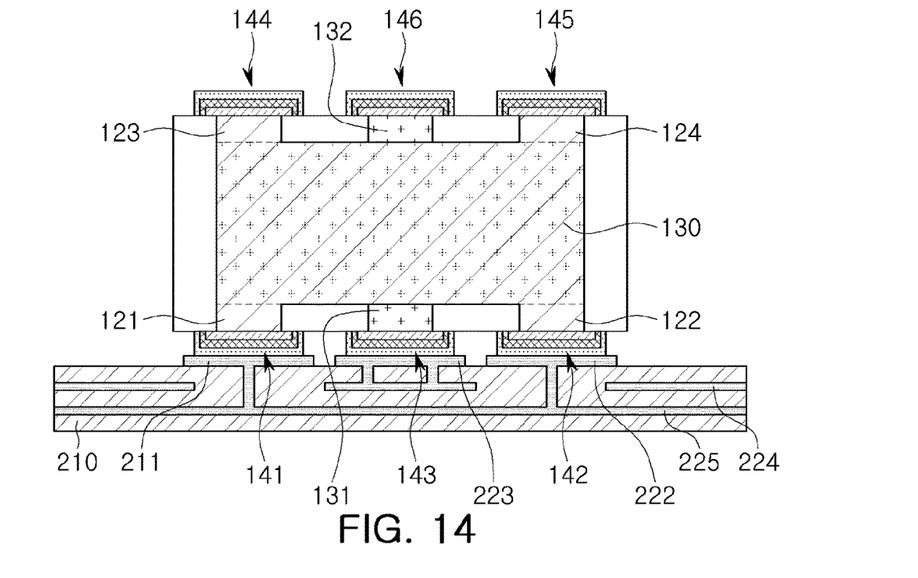
FIG. 14 is a cross-sectional view illustrating the board on which the multilayer ceramic capacitor of FIG. 8 is mounted.

FIG. 13 is a perspective view illustrating a board on which the multilayer ceramic capacitor of FIG. 8 is mounted, and FIG. 14 is a cross-sectional view of FIG. 13.

Referring to FIGS. 13 and 14, a board 200 having a multilayer ceramic capacitor according to the present exemplary embodiment may include a circuit board 210 on which the multilayer ceramic capacitor is mounted and first to third electrode pads 221 to 223 formed on the circuit board 210 to be spaced apart from each other.

In this case, the multilayer ceramic capacitor may be electrically connected to the circuit board 210 by solders 230 in a state in which first to third external electrodes 141 to 143 are positioned to contact the first to third electrode pads 221 to 223.

In FIG. 14, reference numeral 224 indicates a ground terminal, and reference numeral 225 indicates a power terminal.

Meanwhile, although the case in which the multilayer ceramic capacitor of FIG. 8 is mounted is described in the present exemplary embodiment, the present disclosure is not limited thereto. For example, the multilayer ceramic capacitors illustrated in FIGS. 1, 5, 6, and 12 may be similarly mounted on a circuit board to thereby configure boards having multilayer ceramic capacitors.

As set forth above, according to exemplary embodiments in the present disclosure, the intervals between adjacent lead portions of the internal electrodes and the widths of the one-side margin portions of the external electrodes that are not in contact with the corresponding lead portions may be controlled, such that low ESL characteristics may be maintained, and reliability and adhesion strength may be improved.

While exemplary embodiments have been shown and described above, it will be apparent to those skilled in the art that modifications and variations could be made without departing from the scope of the present invention as defined by the appended claims.

What is claimed is:

1. A multilayer ceramic capacitor, comprising:
a ceramic body;
internal electrodes having opposing polarities, alternately disposed within the ceramic body of the ceramic body, and including lead portions which are exposed to a mounting surface of the ceramic body and are spaced apart from each other in a lengthwise direction of the ceramic body; and
external electrodes connected to the lead portions having opposing polarities, respectively,
wherein an interval between adjacent lead portions having opposing polarities, determined in the lengthwise direction, is in a range of 167.3 µm to 500.7 µm,
wherein widths of one-side margin portions of the external electrodes in the length direction of the ceramic body that are not in contact with the corresponding lead portions are in a range of 20.2 µm to 186.9 µm,
wherein an interval between adjacent external electrodes is in a range of 195.6 µm to 460.3 µm,
wherein the external electrodes include first bands extending to portions of opposite side surfaces of the ceramic body in the width direction thereof, and
wherein heights of the first bands of the external electrodes are equal to or more than 73.4 µm, respectively and are equal to or less than an overall height of the capacitor.

2. The multilayer ceramic capacitor of claim 1, wherein the internal electrodes are disposed to be spaced apart from opposite side surfaces of the ceramic body in the lengthwise direction.

3. The multilayer ceramic capacitor of claim 1, wherein the external electrodes include:
conductive layers being in contact with the lead portions disposed in positions corresponding to the conductive layers, respectively; and
plating layers covering the conductive layers.

4. The multilayer ceramic capacitor of claim 3, wherein the plating layers include:
nickel (Ni) plating layers covering the conductive layers; and
tin (Sn) plating layers covering the nickel plating layers.

5. The multilayer ceramic capacitor of claim 1, wherein the internal electrodes include a plurality of first and second internal electrodes which are alternately disposed with at least one of dielectric layers interposed therebetween and form an active portion,
each of the first internal electrodes includes first and second lead portions extended to be exposed to the mounting surface of the ceramic body and disposed to be spaced apart from each other in the lengthwise direction of the ceramic body,
each of the second internal electrodes includes a third lead portion extended to be exposed to the mounting surface of the ceramic body and disposed between the first and second lead portions, and
the external electrodes include first and second external electrodes disposed on the mounting surface of the ceramic body to be spaced apart from each other in the lengthwise direction of the ceramic body and connected to the first and second lead portions, respectively, and a third external electrode disposed between the first and second external electrodes and connected to the third lead portion.

6. The multilayer ceramic capacitor of claim 5, wherein the first and the second external electrodes include second bands extended to portions of opposite surfaces of the ceramic body in the length direction, respectively.

7. The multilayer ceramic capacitor of claim 5, wherein each of the first internal electrodes further includes fourth and fifth lead portions extended to be exposed to the other surface of the ceramic body opposing the mounting surface of the ceramic body and disposed to be spaced apart from each other in the lengthwise direction of the ceramic body,
each of the second internal electrodes further includes a sixth lead portion extended to be exposed to the opposing surface from the mounting surface of the ceramic body and disposed between the fourth and fifth lead portions, and
an insulating layer is disposed on the opposing surface from the mounting surface of the ceramic body.

8. The multilayer ceramic capacitor of claim 5, wherein each of the first internal electrodes further includes fourth and fifth lead portions extended to be exposed to the other surface of the ceramic body opposing the one main surface of the ceramic body and disposed to be spaced apart from each other in the lengthwise direction of the ceramic body,
each of the second internal electrodes further includes a sixth lead portion extended to be exposed to the opposing surface from the mounting surface of the ceramic body and disposed between the fourth and fifth lead portions, and
the external electrodes further include fourth and fifth external electrodes disposed on the opposing surface from the mounting surface of the ceramic body to be spaced apart from each other in the lengthwise direction of the ceramic body and connected to the fourth and fifth lead portions, respectively, and a sixth external electrode disposed between the fourth and fifth external electrodes and connected to the sixth lead portion.

9. The multilayer ceramic capacitor of claim 8, wherein an interval between the fourth or fifth lead portion and the sixth lead portion, determined in the lengthwise direction, is in a range of 167.3 µm to 500.7 µm, and
widths of one-side margin portions of the fourth to sixth external electrodes in the lengthwise direction that are not in contact with the corresponding lead portions are in a range of 20.2 µm to 186.9 µm.

10. The multilayer ceramic capacitor of claim 8, wherein an interval between the fourth or fifth external electrode and the sixth external electrode is in a range of 126.9 µm to 460.3 µm.

11. The multilayer ceramic capacitor of claim 8, wherein the fourth and the fifth external electrodes include second bands extended to portions of opposite surfaces of the ceramic body in the length direction, respectively.

12. The multilayer ceramic capacitor of claim 8, wherein the fourth to sixth external electrodes include:

conductive layers being in contact with the lead portions disposed in positions corresponding to the conductive layers, respectively, and plating layers covering the conductive layers.

13. The multilayer ceramic capacitor of claim 12, wherein the plating layers include:

nickel (Ni) plating layers covering the conductive layers; and tin (Sn) plating layers covering the nickel plating layers.

14. The multilayer ceramic capacitor of claim 5, further comprising cover layers disposed on opposite surfaces of the active portion in the width direction, respectively.

15. The multilayer ceramic capacitor of claim 1, wherein the internal electrodes include a plurality of first and second internal electrodes which are alternately disposed with at least one of dielectric layers interposed therebetween and form an active portion, each of the first internal electrodes includes first and second lead portions extended to be exposed to the mounting surface of the ceramic body and disposed to be spaced apart from each other in the lengthwise direction of the ceramic body, each of the second internal electrodes includes a third lead portion extended to be exposed to the mounting surface of the ceramic body and disposed between the first and second lead portions, and the external electrodes include first and second external electrodes disposed on the mounting surface of the ceramic body to be spaced apart from each other in the lengthwise direction of the ceramic body, connected to the first and second lead portions, respectively, and including second bands extended to portions of opposite side surfaces of the ceramic body in the lengthwise direction, and a third external electrode disposed between the first and second external electrodes and connected to the third lead portion.

16. The multilayer ceramic capacitor of claim 15, wherein each of the first internal electrodes further includes fourth and fifth lead portions extended to be exposed to the other surface of the ceramic body opposing the mounting surface of the ceramic body and disposed to be spaced apart from each other in the lengthwise direction of the ceramic body, each of the second internal electrodes further includes a sixth lead portion extended to be exposed to the opposing surface from the mounting surface of the ceramic body and disposed between the fourth and fifth lead portions, and the external electrodes further include fourth and fifth external electrodes disposed on the opposing surface from the mounting surface of the ceramic body to be spaced apart from each other in the lengthwise direction of the ceramic body, connected to the fourth and fifth lead portions, respectively, and including second bands extended to portions of both side surfaces of the ceramic body in the lengthwise direction, and a sixth external electrode disposed between the fourth and fifth external electrodes and connected to the sixth lead portion.

17. The multilayer ceramic capacitor of claim 16, wherein the fourth to sixth external electrodes include:

conductive layers in contact with the lead portions disposed in positions corresponding to the conductive layers, respectively; and plating layers covering the conductive layers.

18. The multilayer ceramic capacitor of claim 17, wherein the plating layers include:

nickel (Ni) plating layers covering the conductive layers; and tin (Sn) plating layers covering the nickel plating layers.

19. A multilayer ceramic capacitor, comprising:

a ceramic body;

internal electrodes having opposing polarities, alternately disposed within the ceramic body of the ceramic body, and including lead portions which are exposed to a mounting surface of the ceramic body and are spaced apart from each other in a lengthwise direction of the ceramic body; and external electrodes connected to the lead portions having opposing polarities, respectively, wherein an interval between adjacent lead portions having opposing polarities, determined in the lengthwise direction, is equal to or less than 500.7 μm, wherein widths of one-side margin portions of the external electrodes in the length direction of the ceramic body that are not in contact with the corresponding lead portions are greater than 10.5 μm, wherein an interval between adjacent external electrodes is equal to or greater than 195.6 μm and equal to or less than 460.3 μm, wherein the external electrodes include bands extending to portions of opposite side surfaces of the ceramic body in the width direction thereof, and wherein heights of the bands of the external electrodes are equal to or more than 73.4 μm, respectively and are equal to or less than an overall height of the capacitor.

20. The multilayer ceramic capacitor of claim 19, wherein the internal electrodes are disposed to be spaced apart from opposite side surfaces of the ceramic body in the lengthwise direction.

21. The multilayer ceramic capacitor of claim 19, wherein the internal electrodes include a plurality of first and second internal electrodes which are alternately disposed with at least one of dielectric layers interposed therebetween and form an active portion, each of the first internal electrodes includes first and second lead portions extended to be exposed to the mounting surface of the ceramic body and disposed to be spaced apart from each other in the lengthwise direction of the ceramic body, each of the second internal electrodes includes a third lead portion extended to be exposed to the mounting surface of the ceramic body and disposed between the first and second lead portions, and the external electrodes include first and second external electrodes disposed on the mounting surface of the ceramic body to be spaced apart from each other in the lengthwise direction of the ceramic body and connected to the first and second lead portions, respectively, and a third external electrode disposed between the first and second external electrodes and connected to the third lead portion.

22. The multilayer ceramic capacitor of claim 21, wherein each of the first internal electrodes further includes fourth and fifth lead portions extended to be exposed to the other surface of the ceramic body opposing the mounting surface of the ceramic body and disposed to be spaced apart from each other in the lengthwise direction of the ceramic body, each of the second internal electrodes further includes a sixth lead portion extended to be exposed to the other surface of the ceramic body and disposed between the fourth and fifth lead portions, and an insulating layer is disposed on the other surface of the ceramic body.

23. The multilayer ceramic capacitor of claim 21, wherein each of the first internal electrodes further includes fourth and fifth lead portions extended to be exposed to the other surface of the ceramic body opposing the mounting surface of the ceramic body and disposed to be spaced apart from each other in the lengthwise direction of the ceramic body,
   each of the second internal electrodes further includes a sixth lead portion extended to be exposed to the other surface of the ceramic body and disposed between the fourth and fifth lead portions, and
   the external electrodes further include fourth and fifth external electrodes disposed on the other surface of the ceramic body to be spaced apart from each other in the lengthwise direction of the ceramic body and connected to the fourth and fifth lead portions, respectively, and a sixth external electrode disposed between the fourth and fifth external electrodes and connected to the sixth lead portion.

* * * * *